Patented Nov. 26, 1940

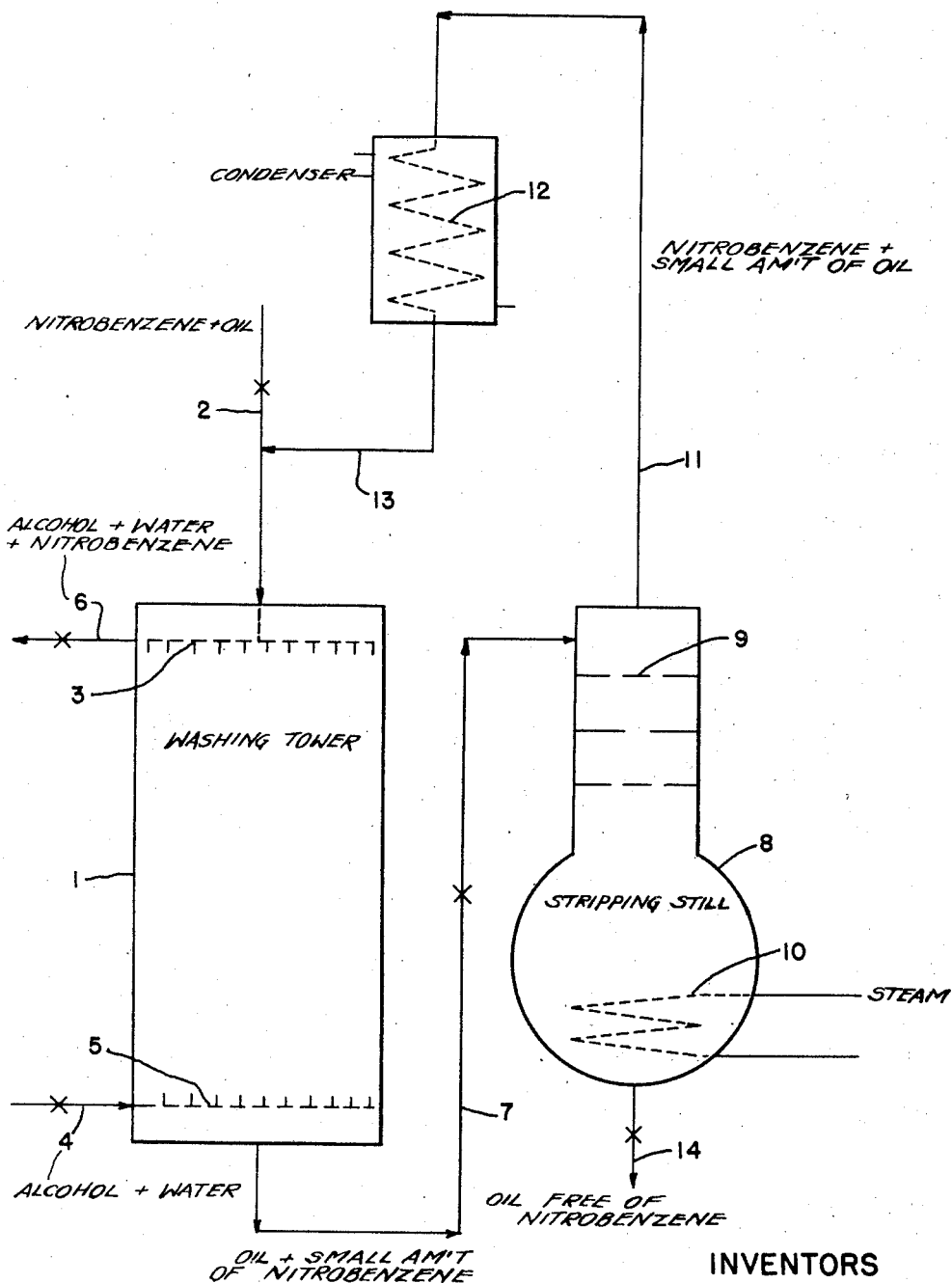

2,222,645

UNITED STATES PATENT OFFICE 2,222,645

SEPARATION OF COMPONENTS OF LIQUID MIXTURES

William W. Aldinger, Lansdowne, and William A. Hall, Manoa, Pa., assignors to The Atlantic Refining Company, Philadelphia, Pa., a corporation of Pennsylvania Application August 17, 1937, Serial No. 159,530

4 Claims. (Cl. 196—13)

The present invention relates to a method for separating mutually soluble components of a liquid system from one another, and relates more particularly to the separation and recovery of selective solvents from hydrocarbon oils which have been subjected to extraction with same.

A principal object of this invention is the separation of mutually soluble components of a liquid system without recourse to conventional fractional distillation and without subjection of the admixed liquid components to temperature sufficient to cause degradation or reaction of the liquid components with one another.

A further object of this invention is the separation and recovery of selective solvents such as nitrobenzene, nitrotoluene, furfural, phenol, aniline, β, β' dichlorodiethyl ether and the like from hydrocarbon oils which have been selectively extracted with same, such separation being effected with the use of a minimum amount of heat and without permitting reaction between the solvents and the oil.

The present invention is particularly adapted to the separation of selective solvents from hydrocarbon oils which have an initial boiling point at least as high as and preferably somewhat above that of the selective solvent. Heretofore it has been customary to extract oils with a selective solvent having a boiling point considerably lower than the initial boiling point of the oil. In such cases it is feasible to separate and recover the selective solvent merely by distillation, with or without some degree of fractionation. However, in the solvent extraction of light hydrocarbon oils or oils containing components having boiling points only slightly higher than that of the selective solvent, it has been impractical and generally impossible to accomplish an efficient separation of solvent from oil merely by vaporization of the former. The use of fractional distillation in such cases is generally not feasible since the size of the fractionating equipment, the higher temperatures necessary when using reflux in a fractionating column, and the possibility of reaction between the oil and the solvent upon prolonged heating at the high temperatures required, renders fractional distillation uneconomical and impractical.

In accordance with our invention we have been able to effect a rapid and economical separation of mutually soluble components of a liquid mixture in which the boiling points of at least some of the components approximate or are slightly different from one another. Such liquid mixture may comprise relatively pure compounds having either approximately the same boiling points, for example, ethyl alcohol and benzene; or different boiling points, for example, acetone and benzene. Furthermore, the liquid mixture may comprise a selective solvent such as nitrobenzene, any hydrocarbon oil, the boiling points of which may approximate one another or may be somewhat different from one another, i. e., the initial boiling point of the oil may be slightly higher than that of the nitrobenzene.

More particularly our method comprises washing a mixture of liquid components which may be arbitrarily designated as A and B with a solvent for one of the components, for example, B, whereby two liquid phases are formed, one consisting essentially of A and small quantities of B and of solvent, and the other consisting essentially of B and a small quantity of A together with a major portion of the solvent. The solvent for component B is characterized in having little or no solvent power for component A under the conditions of separation, and preferably has a boiling point sufficiently different from that of component B as to be readily separable from B by distillation. The two liquid phases so formed are separated by suitable means, for example, by decantation, and that phase consisting essentially of component A and a small quantity of B and solvent is subjected to vaporization or distillation, without recourse to conventional fractionation, whereby substantially all of component B, solvent, and a small portion of A are vaporized from the mixture, leaving a residue consisting of component A substantially free of B and solvent. The vaporized component B, solvent and a small portion of A are then condensed and the condensate returned to the washing step. In this manner the small portion of component A which distills over with component B and solvent functions as a stripping agent for B and the solvent. While our method may be carried out in a batch system, we prefer to employ a continuous system in which, after equilibrium is attained, it is possible to produce a component A of substantially uniform composition and free of component B.

In the process of refining hydrocarbon oils by selective solvent extraction, the solvent is usually recovered from the oil by simple distillation with substantially no vaporization of the oil. If the boiling range of the oil is such that a portion thereof is vaporized with the solvent, fractionation of the solvent may be employed to effect the separation, provided the boiling range of the oil does not overlap that of the selective solvent.

However, as has been pointed out hereinbefore, conventional fractional distillation is generally not practical in view of the size and cost of the fractionating equipment, and the possibility of reaction between the oil and solvent at the relatively high temperatures and long periods of time required for fractionation. Our invention, therefore, provides a means for eliminating conventional fractionation in the separation of mutually soluble liquid mixtures, at least some of the components of which have approximately the same boiling points.

Our invention may be further illustrated with reference to the accompanying drawing which represents diagrammatically a system suitable for carrying out our separation method. The following exemplifies the application of our method to the separation of a selective solvent such as nitrobenzene from hydrocarbon oil having an initial boiling point approximating that of nitrobenzene, i. e., of the order of about 210° C. at atmospheric pressure.

Referring to the drawing, a mutually soluble mixture comprising about 85 volumes of low viscosity hydrocarbon lubricating oil and about 15 volumes of nitrobenzene is continuously introduced into the upper section of washing tower 1 by means of valve-controlled pipe 2 and distributing head 3. Into the lower section of the washing tower is simultaneously introduced, by means of valve-controlled pipe 4 and distributing head 5, a solvent for the nitrobenzene comprising 50% methyl alcohol–50% water. Both the oil-nitrobenzene solution and the alcohol-water solution are preferably preheated, under a pressure sufficient to maintain the components in the liquid phase, to a temperature of the order of about 325° F.–350° F., prior to their introduction into the washing tower 1. In the washing tower, the oil-nitrobenzene solution passes downwardly in intimate countercurrent contact with the upwardly flowing alcohol-water solution and the major portion of the nitrobenzene is washed from the oil by the alcohol-water and remains dissolved therein. The alcohol-water solution containing the nitrobenzene washed from the oil is continuously withdrawn from the upper section of the washing tower through valve-controlled pipe 6 and is thereafter cooled to permit separation of the nitrobenzene from the alcohol-water. The alcohol-water solution, substantially free of nitrobenzene, may then be heated and recirculated to the washing tower 1 by means of valve-controlled pipe 4. From the bottom of the washing tower 1 there is continuously withdrawn a solution comprising about 113 volumes of oil and about 5.7 volumes of nitrobenzene, together with a very small quantity of alcohol-water solution, and this mixture is passed, by means of valve-controlled pipe 7 into the stripping still 8. The still 8 may be provided with baffles 9 and a heating coil 10 and may further be provided with vacuum and/or open steam connections (not shown) to assist, if necessary, in the distillation to be performed therein. In the stripping still 8 substantially all of the nitrobenzene and alcohol-water solution, together with the lower boiling components of the oil, are vaporized from the mixture charged to the still by means of valve-controlled pipe 7. The mixture of vaporized components is withdrawn from the upper section of the still 8 and passed by means of pipe 11 through condenser 12, wherein the vapors are condensed to form a condensate comprising about 28 volumes of light oil, about 5.7 volumes of nitrobenzene, and traces of alcohol-water. The condensate is then returned to the upper section of washing tower 1 by means of pipe 13, in admixture with the oil-nitrobenzene solution being introduced through valve-controlled pipe 2. From the bottom of the stripping still 8 there is continuously withdrawn, by means of valve-controlled pipe 14, about 85 volumes of oil substantially free of nitrobenzene.

Upon continuous operation of the washing-distillation system an equilibrium will be reached in which the quantity of nitrobenzene-free oil withdrawn from the system will be substantially equal to that charged in admixture with nitrobenzene in the washing step. Furthermore, the composition of the nitrobenzene-free oil withdrawn will be substantially the same as that of the oil in the mixture initially charged in the washing step. In the distillation step only sufficient oil is vaporized with the nitrobenzene to insure that all of the nitrobenzene is distilled from the bulk of the mixture charged to the still. The quantity of oil distilled will depend largely upon the boiling range thereof, and the greater the proportion of light oil components in the oil the more will have to be distilled off in order to completely remove the nitrobenzene from the residual oil. It will be seen that in the above described operation the lower boiling oil components are utilized as a means for stripping the solvent from the oil at relatively low temperatures, thereby permitting separation without the use of conventional fractionating equipment and without subjecting the oil-solvent mixture to high temperatures for the considerable period of time which would have been required had conventional fractional distillation been employed as the sole separating means.

While we have described our method of separation particularly with reference to the recovery of a selective solvent such as nitrobenzene from hydrocarbon oil, we do not intend to be limited thereto. Our method is equally applicable to the separation of mutually soluble components of other liquid mixtures from one another. For example, a mixture of alcohol and benzene, or acetone and benzene may be separated into components by utilizing water as the washing solvent, following the general procedure described hereinbefore. The nature of the washing solvent to be employed will depend largely upon the character of the components of the liquid mixture to be separated. Mixtures of hydrocarbon oil with nitrobenzene; nitrotoluene; cresol; dichlorodiethyl ether; aniline; benzonitrile; and benzaldehyde may be washed with alcohol-water or acetone-water solutions for removal of a major portion of the solvent. Or, mixtures of hydrocarbon oil with phenol; furfural; and pyridine may be simply washed with water for the removal of the bulk of the solvent. The composition of the wash solvents, and the ratio of the wash solvents to the mixture to be separated may vary widely, as may the temperature and pressure conditions under which the washing step is to be operated.

Among the wash solvents which may be suitably employed are the aliphatic alcohols such as methyl alcohol, ethyl alcohol, propyl alcohol, isopropyl alcohol, ethylene glycol and glycerol, containing, if necessary, sufficient water to render same substantially immiscible with oil. Ketones such as acetone, methyl ethyl ketone and the like, containing water, may also be utilized.

It will be seen from the foregoing description that, in accordance with our invention, we are able to separate and recover components of a liquid mixture in a simple and economical manner without recourse to substantial fractional distillation and without subjecting the liquid mixture to conditions which may promote reaction between the components thereof.

What we claim is:

1. A method for separating mutually soluble components of a liquid mixture comprising A and B, which comprises washing the liquid mixture with a solvent for component B to form a liquid phase comprising a major portion of component B and said solvent, and a second liquid phase comprising a major portion of component A and a minor portion of component B, separating said liquid phases from one another, vaporizing from the second mentioned liquid phase substantially all of component B and a minor portion of component A to produce a residue comprising the major portion of component A substantially free of component B, condensing the vaporized components and returning the condensate so produced to the liquid mixture undergoing washing.

2. A method for separating a selective solvent from admixture with hydrocarbon oil, which comprises washing the admixture with a solvent for the selective solvent to form a liquid phase comprising a major portion of the selective solvent and said solvent, and a second liquid phase comprising a major portion of the hydrocarbon oil and a minor portion of the selective solvent, separating said liquid phases from one another, vaporizing from said second mentioned liquid phase substantially all of the selective solvent and a minor portion of the hydrocarbon oil to produce a residue comprising the major portion of the hydrocarbon oil substantially free of selective solvent, condensing the vaporized selective solvent and hydrocarbon oil and returning the condensate so produced to the admixture of selective solvent and hydrocarbon oil undergoing washing.

3. A method for separating nitrobenzene from admixture with hydrocarbon oil, which comprises washing the admixture with a solvent for the nitrobenzene to form a liquid phase comprising a major portion of the nitrobenzene and said solvent, and a second liquid phase comprising a major portion of the hydrocarbon oil and a minor portion of the nitrobenzene, separating said liquid phases from one another, vaporizing from said second mentioned liquid phase substantially all of the nitrobenzene and a minor portion of the hydrocarbon oil to produce a residue comprising the major portion of the hydrocarbon oil substantially free of nitrobenzene, condensing the vaporized nitrobenzene and hydrocarbon oil and returning the condensate so produced to the admixture of nitrobenzene and hydrocarbon oil undergoing washing.

4. A method for separating nitrobenzene from admixture with hydrocarbon oil, which comprises washing the admixture with methyl alcohol-water solution to form a liquid phase comprising a major portion of the nitrobenzene and said methyl alcohol-water solution, and a second liquid phase comprising a major portion of the hydrocarbon oil and a minor portion of nitrobenzene, separating said liquid phases from one another, vaporizing from said second mentioned liquid phase substantially all of the nitrobenzene and a minor portion of the hydrocarbon oil to produce a residue comprising a major portion of the hydrocarbon oil substantially free of nitrobenzene, condensing the vaporized nitrobenzene and hydrocarbon oil and returning the condensate so produced to the admixture of nitrobenzene and hydrocarbon oil undergoing washing.

WILLIAM W. ALDINGER.
WILLIAM A. HALL.

CERTIFICATE OF CORRECTION.

Patent No. 2,222,645.  November 26, 1940.

WILLIAM W. ALDINGER, ET AL.

It is hereby certified that error appears in the printed specification of the above numbered patent requiring correction as follows: Page 1, second column, line 6, for the word "any" read --and--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.